United States Patent Office 3,526,833
Patented Sept. 1, 1970

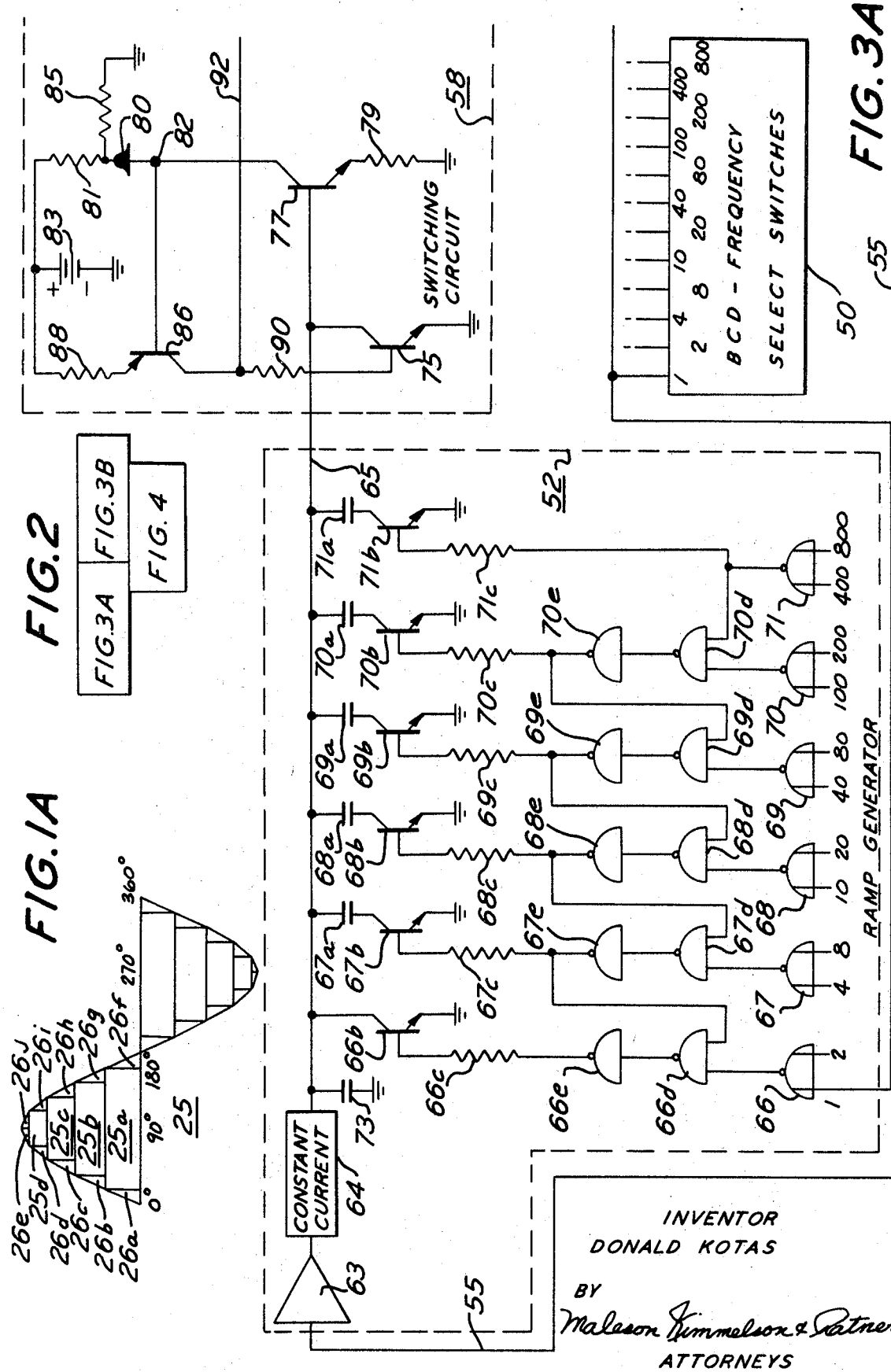

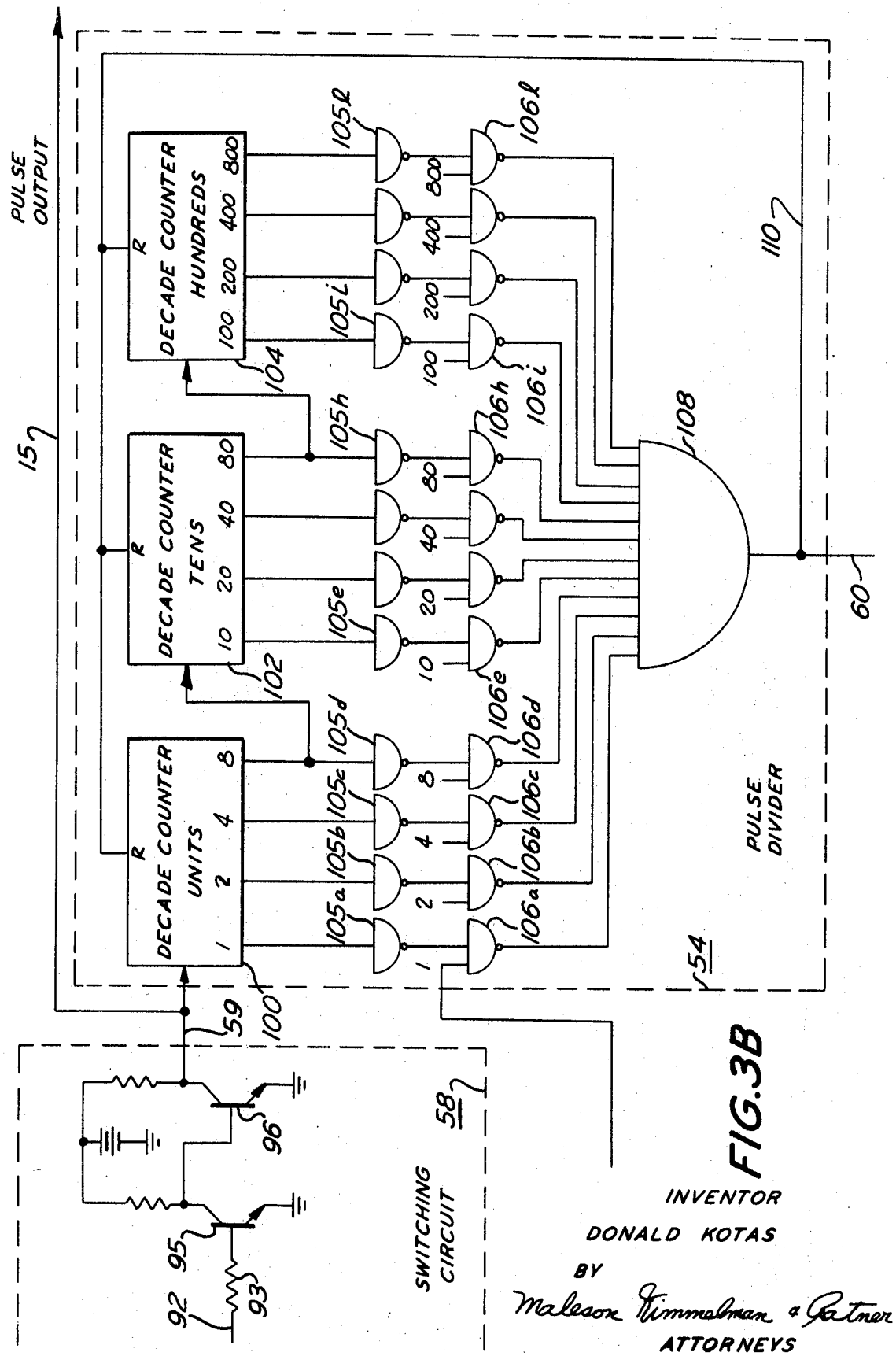

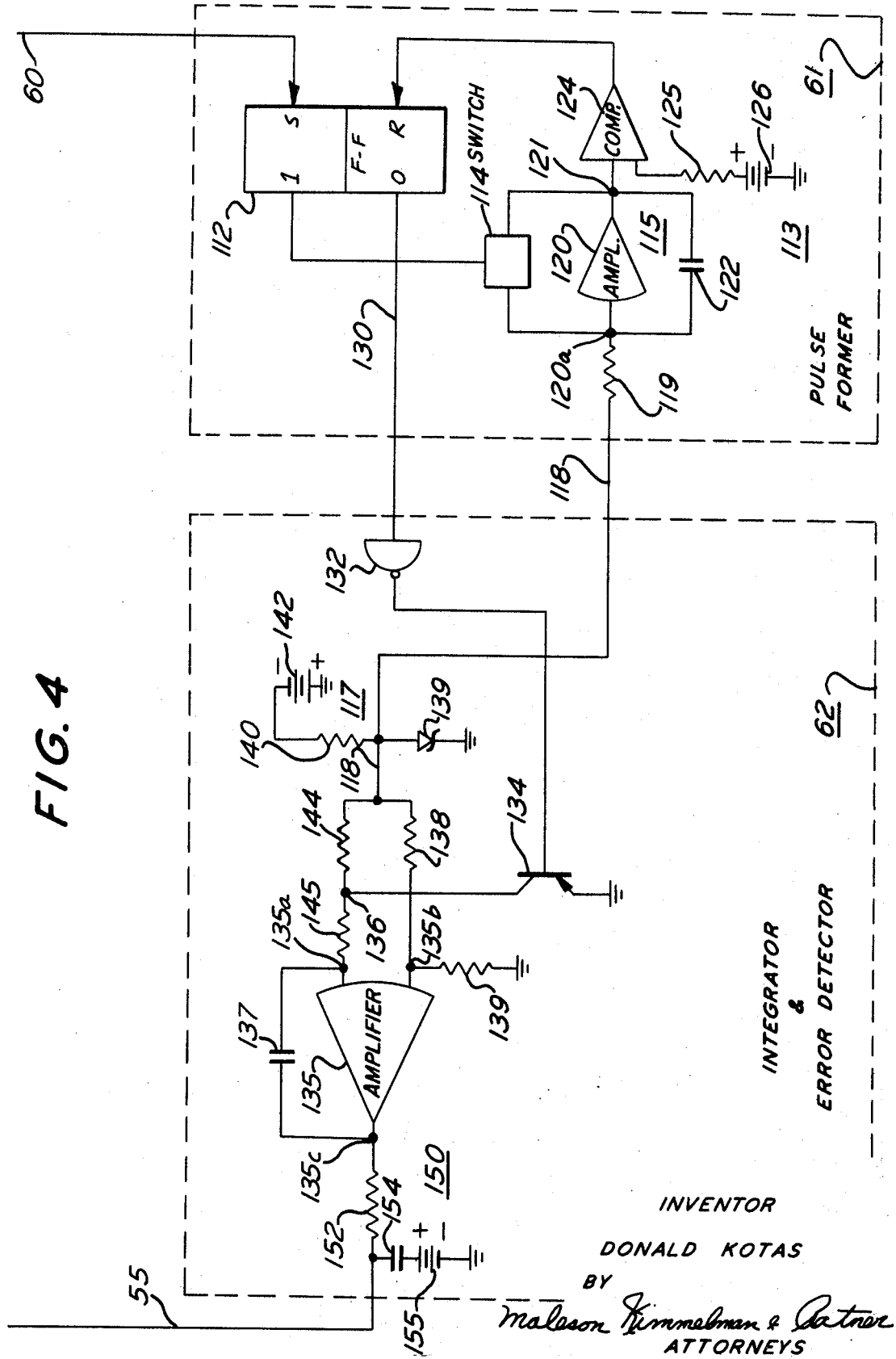

3,526,833
FREQUENCY RESPONSE ANALYZER INCLUDING A FUNCTION GENERATOR SECTION AND A COLLATOR SECTION
Donald Kotas, Roslyn, Pa., assignor to Weston Instruments, Inc., Newark, N.J., a corporation of Delaware
Filed Mar. 15, 1968, Ser. No. 713,513
Int. Cl. G01r 27/00; G06g 7/19; G06f 15/34
U.S. Cl. 324—57       8 Claims

ABSTRACT OF THE DISCLOSURE

A frequency response analyzer having a function generator section for providing constant amplitude stimulating signals over a frequency range to a system under test. An output of the test system is simultaneously applied to a pair of multipliers of a correlator section one of which is programed for sine and the other for cosine multiplication. The output of each of the multipliers is integrated and the timing of the correlator is controlled by the function generator. The function generator produces a first train of pulses having a PRF which may be varied over a PRF range. The PRF of the first pulse is divided by a selected decimal value for producing a second pulse train. A feedback signal is produced to control the generation of the first pulse train having a rate of change in value proportional to and in a direction related to any difference in the PRF of the second pulse train from a predetermined value.

BACKGROUND OF THE INVENTION

Field of the invention

This invention relates to the field of art of frequency response analysis in which a signal is generated to stimulate a system under test and the response of that system to the stimulating signal is measured over a range of frequencies.

Prior art

Frequency response analyzers comprise a function generator section which generates a stimulating signal having a constant amplitude. The constant amplitude is maintained over a predetermined range of signal frequencies. The stimulating signal is applied as an input reference signal to a system under test and as the frequency of the stimulating signal is varied an output of the system under test is measured for a correlator section of the analyzer. The correlator section compares the output of the test system with the stimulating signal and provides measurements such as transfer function measurements.

The stimulating signals may be of sinusoidal waveform produced by generating a plurality of separate signals of rectangular waveform and separate signals of a triangular waveform. These signals are summed to provide a composite stimulating signal of sinusoidal shape. The output of the system under test is simultaneously applied to two multipliers of the correlator section; one of which is programed for sine and the other for cosine multiplication. The timing sequence of the multiplication is controlled by the function generator and the output of each multiplier is applied to a separate integrator. Each integrator integrates its respective input and stores the resultant output as a DC voltage.

The stored DC voltages are proportional to the cartesian coordinates of a vector which represents the fundamental frequency component of the output of the system under test. Noise and harmonic frequencies originally present in the system under test output have been integrated to a point where their effect is negligible. The cartesian coordinates which are stored as DC voltages may be resolved to provide vector length or amplitude R and phase relationship $\theta$. In this manner, as the frequency of the stimulating signal is varied the values of R and $\theta$ provide a measurement of the gain of the system under test with respect to frequency.

It will be understood that the accuracy of the measurements is dependent on the function generator which provides the stimulating signals and controls the timing sequence of the correlator. More particularly the function generator includes a master oscillator and pulse generator which provides a train of pulses over a predetermined range of pulse repetition frequencies (PRF). The pulse train is applied to a counter which actuates switchable precision resistors thereby to generate a stimulating signal having an amplitude which may be maintained constant with high precision for both time and frequency changes. In addition the train of pulses is applied to a sequence controller of the correlator to synchronize the operation of the correlator with the stimulating signal. Accordinngly the accuracy of the measurements is directly dependent on the accuracy of the frequency of the pulses produced by the pulse generator. However, prior pulse generators have used switchable capacitance circuits for setting each pulse frequency and the capacitive values may change with temperature variation and aging. In order to maintain the accuracy of the frequency setting, costly high accuracy capacitors have been required. In addition each of the capacitors corresponding to a differing frequency have been individually adjusted and then adjusted in combination with the remaining capacitors.

SUMMARY OF THE INVENTION

The frequency response analyzer of the invention includes a function generator section comprising a pulse generator system which produces a first train of pulses. The first pulse train has a PRF which may be varied over a PRF range thereby to vary the stimulating signals over the frequency range. A counter and switch system produces constant amplitude stimulating signals in the form of uniform composite cyclic waveforms. The correlator section includes a sine and a cosine multiplier each having a respective integrator. A controller is connected to the pulse generator system and to the counter and switch system for synchronizing the operation of the correlator with the stimulating signal.

In order to select a desired number value of a first pulse train PRF within the PRF range selectively adjustable switches are used to provide signals representing the selected number value. The number values are formed into a plurality of bands of values. The pulse generator system includes a generator and switching system connected to the adjustable switches for producing the first train of pulses in which the PRF is varied in accordance with the band associated with the selected number value and proportional to the value of an applied control signal. The PRF of the first pulse train is divided by the selected number value for producing a second train of pulses. The second train of pulses is applied to an error detector system which produces the control signal for adjusting the value of the first pulse train. The control signal has a rate of change in value proportional to and in a direction related to any difference in the second pulse train PRF from a predetermined value. The PRF of the first train of pulses is varied in a direction to decrease the PRF difference until the PRF of the second pulse train is equal to the predetermined value. At that time the control signal has a zero rate of change or constant value. In this manner the accuracy of the PRF is not dependent on capacitance circuits and control is achieved by calibrating a pulse train at only a single PRF, viz., the second train of pulses.

BRIEF DESCRIPTION OF THE DRAWINGS

FIG. 1A illustrates a waveform generated by the function generator of FIG. 1;

FIG. 2 illustrates the manner in which FIGS. 3A–3B may be taken together;

FIGS. 3A, 3B and 4 when taken together illustrates in more detail the oscillator and pulse generator shown in block diagram form in FIG. 1.

Referring now to FIG. 1 there is shown a frequency response analyzer comprising a function generator section 10 and a correlator section 11 of the type described in detail in (1) U.S. patent application Ser. No. 581,275 now U.S. Pat. No. 3,453,534 for Transfer Function Analyzer filed Sept. 22, 1966 by Frank E. Post and assigned to the same assignee as the present invention, (2) U.S. patent application Ser. No. 568,058 now U.S. Pat. No. 3,340,469 for Transfer Function Testing Apparatus Utilizing a Sine Wave Transfer Function Obtained By Combining Rectangular and Triangular Waveforms filed July 26, 1966 by Reginald Catherall, et al. and (3) Instruction Manual, Transfer Function Analyzer, model series DA 400 Weston Instruments, Inc., Hatboro, Pa. 19040.

Figure 1:
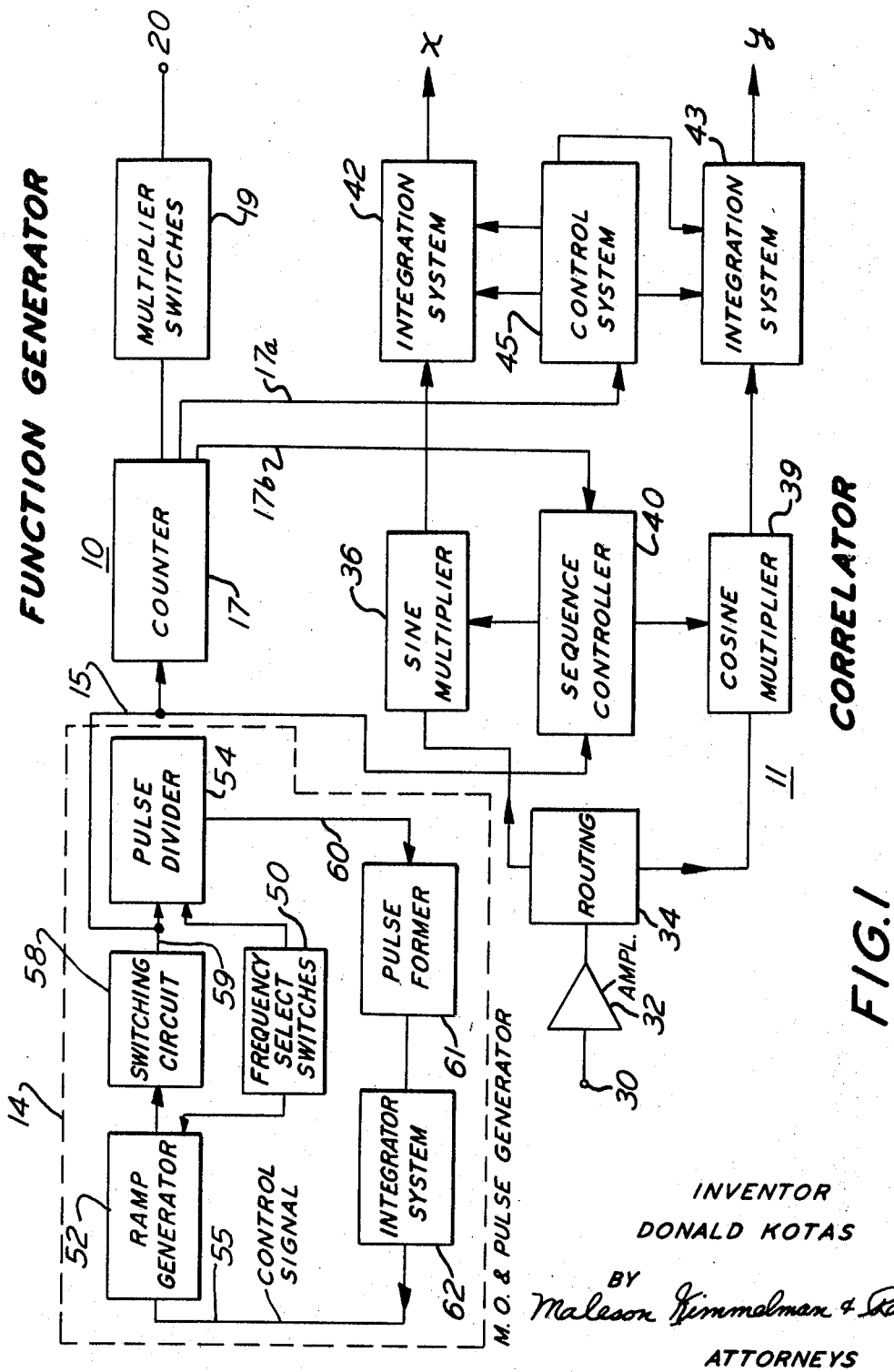
FIG. 1 illustrates in block diagram form a frequency response analyzer embodying the invention.

Function generator 10 comprises a master oscillator and pulse generator 14, a counter 17 and multiplier switching circuits 19. Generator 14 produces a periodic train of pulses which is applied by way of an output conductor 15 to counter 17. Counter 17 provides differing counting pulses to circuits 19 which generate a composite waveform approximating a sine wave at generator output 20. The composite waveform is applied as a stimulating signal to a system under test such as a servo-system.

One cycle 25 of a composite waveform of a simple type is illustrated in FIG. 1A. The first half cycle of waveform 25 may comprise four parts 25a–d of rectangular waveform. The rectangular waveforms are of progressively shorter duration and of progressively smaller amplitudes with the four parts being symmetrical and added one on the other in the illustrated order. Further the first quarter cycle from 0° to 90° has added thereto five parts 26a–e of right-angle triangular waveform of equal durations but progressively smaller amplitudes. The second quarter cycle from 90° to 180° also has five triangular parts 26f–j identical in amplitude with parts 26a—e respectively but with the slopes of the hypotenuses reversed at 90°.

Each of the triangular waveforms 26 a–j are representative of 18° steps. In order to provide a smoother waveform the hypotenuse of each of the triangular wave forms may be divided into one degree steps. It will also be understood that the first half cycle of waveform 25 may be divided into more parts, such as eight parts of rectangular waveform and a corresponding number of nine parts of triangular waveform. The second half cycle of waveform 25 is identical with the first half cycle except that it is negative going instead of positive going.

Under the control of a train of pulses from generator 14, counter system 17 counts up from 0° to 90° then counts down from 90° to 0° for the first half cycle. During the up count the slope of the hypotenuse of the triangular waveform is in one direction and during the down count the slope is in the other direction. At 180° an individual counter of counter system 17 is set to provide for a plurality reversal. Another up count is performed from 180° to 270° and a down count is performed from 270° to 360°. At 360° a cycle has been completed and the previously described counting is repeated for another cycle. The composite waveform may be generally defined as a uniform cyclic waveform or a single frequency alternating waveform. In order to indicate the completion of a cycle, counter system 17 provides an output signal by way of an output 17a.

The outputs of counter 17 are applied to mulitplier switches 19 which comprises a plurality of semiconductor switches connected to respective precision resistors which generate the previously described rectangular and triangular shaped waveforms. The switch-resistor combinations are weighted to provide the proper size rectangles and triangles. In this manner there is produced a sine wave of both positive and negative half cycles having its timing accurately controlled in accordance with the pulses produced by pulse generator 14.

The composite sinusoidal waveform is applied by way of an output terminal 20 as a stimulating signal to a system under test. In a testing procedure an output of the system under test may be applied as an input signal to an input terminal 30 of correlator section 11. The signal applied to terminal 30 is amplified by input amplifier 32 and applied to a multiplier routing network 34. When measurement is to be taken at a predetermined stimulating frequency, network 30 routes the signal simultaneously to two digital multipliers 36 and 37; multiplier 36 being programmed for sine multiplication and multiplier 37 being programmed for cosine multiplication. These multipliers are controlled in synchronism with the stimulating signal by means of a sequence controller 40. Specifically the pulses from generator 14 are applied by way of output 15 and conductor 38 to controller 40. In addition the counting pulses from counter system 17 which is controlled by generator 14 are applied by way of output 17b to controller 40. Sequence controller 40 is similar in construction to that of counter 17 and counts in accordance with the applied pulses and counting pulses. Accordingly controller 40 applies control signals to sine and cosine multipliers 36 and 37 so that these multipliers operate in synchronism with the generation of the stimulating waveform.

The output of sine multiplier 36 is applied to a variable gain integration system 42 which integrates the output of multiplier 36 over an integration period and stores the resultant integrated signal as a DC voltage. This DC voltage is proportional to the $x$ coordinate of a vector which represents the fundamental frequency component of the output from the system under test. Similarly the output of cosine multiplier 37 is applied to a variable gain integration sytsem 42 which integrates the output of multiplier 37 over an integration period and stores the resultant integrated signal as a DC voltage. This DC voltage is proportional to the $y$ coordinate of a vector which represents the fundamental frequency component of the ouptut for the system under test. The foregoing cartesian coordinates may be converted to polar coordinates to provide a vector length R and a phase angle $\theta$. Integration systems 42 and 43 operate under control of a control system 45 having applied thereto the cycle signals from output 17a. Integration systems 42 and 43 and control system 45 are described in detail in copending U.S. patent application Ser. No. 713,461, filed March 15, 1968 for Frequency Response Analyzer by Frank E. Post and assigned to the same assignee as the present invention.

Generator 14 produces a periodic train of rectangular pulses having a pulse repetition frequency (PRF) which may be varied over a predetermined range of frequencies as for example, 3.6 kHz, to 3.6 MHz. In order to select a desired decimal integer number value of a PRF, generator 14 includes frequency select switches 50. Switches 50 may be manually set to provide signals in binary coded decimal (BCD) notation representing the desired decimal number. The BCD signals are applied to a ramp generator 52 and a pulse divider 54.

In accordance with the decimal setting being within a predetermined one of a plurality of bands of decimal values, one or more of a small plurality of switchable range capacitors are selected for ramp generator 52. Accordingly generator 52 produces a ramp voltage having a slope inversely proportional to the value of the selected range capacitors and directly proportional to the value of a control voltage applied by way of feedback control conductor 55. When the ramp voltage reaches a predetermined level, the capacitors are discharged and a sawtooth waveform is generated. The sawtooth signals are converted by a swtiching circuit 58 into rectangular pulses with each pulse (1) having a spacing substantially equal to the period of a respective ramp of a sawtooth signal and (2) a pulse width substantially equal to the discharge or flyback time of the respective sawtooth signal. The resultant train of rectangular shaped pulses is applied by way of output conductor 59 to a pulse divider 54 which is effective to divide the pulse repetition frequency of the train by the selected decimal number setting. By means of a feedback network comprising pulse former 61 and integrator system 52 the PRF at an output 60 of divider 54 is held at a single predetermined value, as for example 3600 pulses per second (p.p.s.).

Specifically pulse former 61 is effective to produce rectangular pulses of constant pulse width having a PRF equal to the PRF at output 60. Integrator and error detector 62 averages these rectangular pulses and provides a control signal by way of conductor 55 of direction related to and having a rate of change which is proportional to any difference in the PRF of output 60 from 3600 p.p.s. In this manner the frequency of the sawtooth signals is varied in a direction to decrease the frequency error until the PRF at output 60 is equal to the predetermined frequency of 3600 p.p.s. and the control voltage has a zero rate of change i.e., a constant value. Accordingly the PRF of output 60 is brought to and maintained constant at 3600 p.p.s. The PRF at output 59 is also maintained constant and equal to the PRF of output 60 (3600 p.p.s.) times the decimal number setting of switches 50. Thus a highly accurate pulse repetition frequency is produced at conductor 59 which is applied by way of output conductor 15 as the output of pulse generator 14. In accordance with the invention only a single frequency need be calibrated, viz., 3600 p.p.s at output 60, for a range of frequencies produced at generator output conductor 15.

Referring now to FIGS. 2–4 there is shown in more detail master oscillator and pulse generator 14 illustrated in block diagram form in FIG. 1. Frequency select switches 50 comprise conventional manually operated BCD switches and provide signals in binary coded decimal notation representing decimal number settings from 1 to 999. Specifically switches 50 comprise three groups of four output terminals with each group representing a four figured binary number. For example, the decimal number settings 369–380 provide the following BCD output signals at the respective BCD output terminals:

capacitors 67a–71a and a fixed range capacitor 73. The feedback control signal is applied by way of conductor 55 to the input of amplifier 63 and the output of amplifier 63 is connected to source 64. Source 64 provides a constant charging current of value proportional to the value of the control voltage. The charging current from source 64 is effective to charge capacitor 73 and those range capacitors 67a–71a which are switched to be connected in parallel with capacitor 73. The resultant positive going ramp voltage produced between conductor 65 and ground has a slope which is inversely proportional to the value of the range capacitors in circuit and directly proportional to the value of the control voltage.

The operation of switching the range capacitors will now be explained assuming positive logic. Range capacitors 67a–71a are associated with gates 67–71 and are selected to have decreasing capacitive values. Capacitor 73 is selected to be of lowest capacitive value. The ends of capacitors 67a–71a remote from conductor 65 are connected to ground by way of the collector, base and emitter of NPN switching transistors 67b–71b respectively. Thus only those capacitors associated with switching transistors 67b–71b which are turned on are connected in parallel with fixed range capacitor 73.

To provide for the proper switching operation, NAND gates 66d–70d have first inputs connected to outputs of gates 66–70 respectively and the output signals of gates 66d–70d are respectively inverted by inverters 66e–70e. The output of inverter 70e is connected (1) by way of a resistor 70c to the base of transistor 70b and (2) to a second input of gate 69d. Similarly the output of inverter 69e is connected to transistor 69b and to a second input of gate 68d; gate 68e is connected to trasistor 68b and to gate 67d; and gate 67e is connected to transistor 67b and gate 66d. Gate 71 is connected to a second input of gate 70d and by way of resistor 71c to the base of switching transistor 71b.

Accordingly for BCD signals representative of integer decimal numbers of 400 or more, it will be understood that gate 71 provides a 0-state output (negative going signal) since one of its inputs is always in a 1-state. These decimal numbers will be considered to form a band of values of maximum weight. The 0-state output of gate 71 is effective to turn off transistor 71b and to produce a 1-state output from gate 70d irrespective of the state of its first input. The 1-state output of gate 70d is inverted by inverter 70e and the resultant 0-state signal is effective to turn off transistor 70b and to produce a 1-state signal from gate 69d. In this manner a 0-state signal is transmitted down the line from right to left thereby to turn off the remaining transistors 66b–68b.

BCD OUTPUT

| Decimal No. setting | 1 | 2 | 4 | 8 | 10 | 20 | 40 | 80 | 100 | 200 | 400 | 800 |
|---|---|---|---|---|---|---|---|---|---|---|---|---|
| 369 | 1 | 0 | 0 | 1 | 0 | 1 | 1 | 0 | 1 | 1 | 0 | 0 |
| 370 | 0 | 0 | 0 | 0 | 1 | 1 | 1 | 0 | 1 | 1 | 0 | 0 |
| 371 | 1 | 0 | 0 | 0 | 1 | 1 | 1 | 0 | 1 | 1 | 0 | 0 |
| 372 | 0 | 1 | 0 | 0 | 1 | 1 | 1 | 0 | 1 | 1 | 0 | 0 |
| 373 | 1 | 1 | 0 | 0 | 1 | 1 | 1 | 0 | 1 | 1 | 0 | 0 |
| 374 | 0 | 0 | 1 | 0 | 1 | 1 | 1 | 0 | 1 | 1 | 0 | 0 |
| 375 | 1 | 0 | 1 | 0 | 1 | 1 | 1 | 0 | 1 | 1 | 0 | 0 |
| 376 | 0 | 1 | 1 | 0 | 1 | 1 | 1 | 0 | 1 | 1 | 0 | 0 |
| 377 | 1 | 1 | 1 | 0 | 1 | 1 | 1 | 0 | 1 | 1 | 0 | 0 |
| 378 | 0 | 0 | 0 | 1 | 1 | 1 | 1 | 0 | 1 | 1 | 0 | 0 |
| 379 | 1 | 0 | 0 | 1 | 1 | 1 | 1 | 0 | 1 | 1 | 0 | 0 |
| 380 | 0 | 0 | 0 | 0 | 0 | 0 | 0 | 1 | 1 | 1 | 0 | 0 |

Switches 50 may be the type shown in a catalog by Electronic Engineering Co. of California, Model 157 Binary Coded Decimal Rotary Thumb Wheel Switches, April 1966.

The BCD output signals from switches 50 are applied as illustrated to conventional NOR gates 66–71 for control of the switching of the differing range capacitors of ramp generator 52. Generator 52 comprises an amplifier 63 and a constant current generator 64 having an output conductor 65 to which are connected switchable range In the foregoing manner for decimal settings of 400 or more only fixed range capacitor 73 is connected in circuit between conductor 65 and ground. Since capacitor 73 is selected to be of lowest capacitive value, the generated ramp will have a maximum slope for a constant control voltage. As will later be described in detail with the generated ramp having a maximum slope, the PRF of the resultant sawtooth waveform will be at a maximum frequency range.

The next lower weight band is for decimal settings from 100 to 399. Accordingly 0-state signals are applied to both inputs of gate 71 and the resultant 1-state output is effective to turn on transistor 71b so that capacitor 71a is connected in parallel with capacitor 73. For this range of decimal settings, gate 70 produces a 0-state output which is effective to turn off transistor 70b and to provide a 0-state signal which is transmitted down the line to turn off each of the remaining transistors.

With the above explanation it will be understood how the remaining range capacitors are in turn connected in parallel with resistors 71a and 73. Specifically, for decimal settings in the next lower weight band from 40 to 99, transistor 70b is additionally turned on; for decimal settings in the next lower weight band from 10 to 39, transistor 69b is additionally turned on; for decimal settings in the next lower weight band from 4 to 9, transistor 68b is additionally turned on; and for decimal settings in the lowest weight band from 1 to 3, transistor 67b is additionally turned on. Thus it will now be understood that for a minimum decimal setting of 1 to 3 that all of the range capacitors 67a–70a are connected in parallel circuit relation with fixed range capacitor 73, for a maximum capacitive value. Thus the slope of the ramp is inversely proportional to the value of the range capacitors connected in circuit and directly proportional to the weight of the band associated with the selected decimal setting. For a decimal setting of 0, a transistor 66b is turned on thereby shunting conductor 65 to ground. Thus, the ramp is clamped to ground inhibiting the pulse forming operation.

It will be assumed for the purposes of explanation that switches 50 are actuated to a decimal setting of 2 so that all of the range capacitors 67a–71a are connected in parallel with fixed range capacitor 73. Thus at the beginning of a ramp, starting at zero potential, the ramp voltage increases at a slope (1) directly proportional to the value of the control voltage and (2) inversely proportional to the large total value of the range capacitance or capacitors 67a–71a and 73. This ramp potential is applied by way of conductor 65 to the collector of a shorting NPN (switching) transistor 75 and to the base of an NPN switching transistor 77 of switching circuit 58. Shorting transistor 75 is assumed to be turned off and thus the positive going ramp voltage is effective to turn on transistor 77. The emitter of transistor 77 is connected by way of a degenerating resistor 79 to ground. Since resistor 79 is selected to be of substantially high resistance value the current flow through transistor 77 is proportional to the ramp voltage applied to the base thereof. The collector of transistor 77 may be traced by way of a junction 82, the anode and cathode of a tunnel diode 80, one resistor 81 of a voltage divider to the positive side of a battery 83. The other resistor 85 of the voltage divider is connected between the cathode of diode 80 and ground.

Accordingly, as the ramp potential increases, the current at the collector of transistor 77 increases which current is applied through diode 80 and resistor 81 to battery 83. In accordance with the characteristics of a tunnel diode, up to a certain threshold, the voltage change is substantially of small value for increasing current. However when the current reaches a predetermined threshold level, the voltage changes and substantially increases for the same current. Thus as the current through diode 80 initially increases, the voltage at junction 82 varies by a substantially small value. However when the current reaches the threshold value, the potential at junction 82 suddenly increases by approximately .5 volt which is applied to the base of a switching transistor 86 thereby to turn on that transistor. With transistor 86 turned on a circuit may be traced from the positive side of battery 83, a resistor 88, turned on transistor 86 and then by way of a resistor 90 to the base of transistor 75. In this manner shorting transistor 75 is turned on and the current flow through conductor 65 is diverted from the range capacitors through transistor 75 to ground.

With current flowing from conductor 65 to ground, the voltage at conductor 65 begins to decrease or "flyback" and thus the current through tunnel diode 80 decreases in proportion thereto. The voltage across the tunnel diode follows the back portion of the characteristic curve until the unstable point is reached at which time the potential at junction 82 suddenly drops to a substantially small value. At this time the decrease in potential is effective to turn off transistor 86 which is effective to turn off shorting transistor 75. Thus current is no longer diverted from the range capacitors and the next ramp voltage may begin from approximately ground potential in the manner previously described. Accordingly a resultant sawtooth waveform is defined comprising a ramp and a "fly-back" time.

In order to produce a train of rectangular pulses, an output is taken from the collector of transistor 86 by way of an output conductor 92. Conductor 92 is connected by way of a resistor 93 to the base of a switching transistor 95. In the above described operation transistor 86 is turned off at the beginning of each ramp and turned on at the end of each ramp and this change is amplified by switching transistor 95 to provide a train of amplified rectangular pulses. These pulses are inverted by transistor 96. Accordingly there is produced at output conductor 59 connected to the collector of transistor 96, a train of rectangular pulses with each pulse having a spacing substantially equal to the time duration of a respective ramp of the sawtooth and a pulse width substantially equal to the fly-back time.

The train of rectangular pulses is applied by way of conductor 59 to pulse divider 54 which is effective to divide the PRF of the train by the decimal setting of switches 50. Specifically conductor 59 is connected to a counting input of a units decade counter 100 having BCD outputs 1, 2, 4 and 8. The 8 output is applied as the counting input to a tens decade counter 102 having BCD outputs 10, 20, 40 and 80. The trailing edge of a counting pulse produced at the 8 output provides the tens count. Similarly the trailing edge of a counting pulse produced at the 80 output of counter 102 provides the hundreds count which is applied to a counting input of a hundreds decade counter 104 having BCD outputs 100, 200, 400 and 800. In this manner counters 100, 102 and 104 count the train of pulses on conductor 59 from 1 to 999 or until being reset. Decade counters are well known in the art and are shown for example in Product Bulletin SC9435, Type SN7490N Decade Counter, Texas Instruments, Inc., November 1966.

The BCD outputs of counters 100, 102 and 104 are connected through respective inverters 105a–l to first inputs of NAND gates 105a–l. The outputs of gates 106 a–l are applied to respective inputs of a single AND gate 108. The BCD output conductors of switches 50 are respectively connected to second inputs of NAND gates 106a–l.

In order to explain the operation of divider 54 the assumed case of a decimal setting of 2 will be used. Accordingly 0-state signals are applied to the second input of each of gates 106a and 106c–l so that these gates produce 1-state output signals regardless of the state of the first inputs thereof. On the other hand a 1-state signal is applied to the second input of gate 106b representing the decimal number 2. Assuming a zero count by the decade counters a 1-state signal is applied to the first input of gate 106b. Thus gate 106b provides a 0-state output which is effective to disable gate 108. At a count of two by the decade counters, gate 106b produces a 1-state signal thereby to enable gate 108 which produces a 1-state output by way of divider output 60. The output of gate 108 is also applied by way of conductor 110 to the reset terminals of counters 100, 102 and 104 thereby to reset these counters at a count of two. In this manner pulse divider 54 produces a single pulse output for every two pulses applied by way of conductor 59. Thus, divider 54 divides the pulse repetition frequency of the pulse train at output 15 by the decimal setting of 2. With the above explanation it will be understood that by changing the decimal setting the divisor of the pulse train is correspondingly changed.

The pulses at output 60 are applied to a set input of a flip-flop 112 of pulse former 61 which also includes a constant timing circuit 113. Timing circuit 113 comprises a switchable ramp generator 115 the output of which is applied through a comparator 124 to a reset input of flip-flop 112. The pulses applied by way of output 60 are positive going and spike shaped and are effective to switch flip-flop 112 to produce a 1-state signal at a 1-output. The 1-output is connected to a switching circuit 114 which is operable to open and close a shorting connection between a summing junction 120a and an output junction 121 of ramp generator operational amplifier 120. A negative potential voltage standard 117 of high accuracy is applied to summing junction 120a by way of conductor 118 and resistor 119.

In operation, the 1-state signal produced at the 1-output of flip-flop 112 is effective to provide an open circuit through switch 114 and therefore capacitor 122 connected between junctions 121 and 120a-begins to charge and a positive going ramp voltage of predetermined slope is generated at junction 121. The ramp voltage is applied to the upper input of comparator 124, the lower input of which is connected by way of a resistor 125 to the positive side of a reference battery 126. When the ramp potential reaches a value equal to that at the lower input, amplifier 124 produces a positive going signal which is applied to reset flip-flop 112. With flip-flop 112 reset a 0-state signal is applied to provide a closed circuit through switch 114 and generator 115 is ready to generate the next ramp.

In summary, upon application of a positive going pulse at output 60, flip-flop 112 is set and then after a predetermined time duration, flip-flop 112 is reset. In this manner a positive going rectangular pulse is produced at the 0-side of flip-flop 112 of constant pulse width accurately controlled in time duration by the constant timing circuit 113. These pulses comprise a train of positive going rectangular pulses of constant pulse width having a PRF equal to the PRF at output 60. This pulse train is applied by way of an output conductor 130 through an inverter 132 to the base of a PNP switching transistor 134. In this manner transistor 134 is turned on during the time of each positive going pulse produced at conductor 130. System 62 is effective to average these pulses and provide a control signal by way of feedback conductor 55 having a rate of change which is proportional to any difference in the PRF of these pulses from 3600 p.p.s.

Specifically system 62 comprises a differential input and single ended output amplifier 135 having an upper input 135a and a lower input 135b. Input 135a is connected by way of an integrating capacitor 137 to an output 135c of amplifier 135. Input 135b is connected to the midpoint of voltage divider resistors 138 and 139 with the other end of resistor 139 being connected to ground and the other end of resistor 138 being connected by way of conductor 118 to voltage standard 117. In this manner input 135b is maintained at a constant negative potential.

The standard comprises a Zener diode connected to the negative side of a battery 142 by way of conductor 118 and a resistor 140. The positive side of that battery and the cathode of the diode 139 are connected to ground. The negative potential of voltage standard 117 is also applied by way of conductor 118, resistor 144, junction 136, and resistor 145 to input terminal 135a. Resistors 138, 139 and 144, 145 and the value of the voltage standard are selected to provide an average current flow into amplifier terminal 135a equal to zero when transistor 134 is switched at exactly 3600 p.p.s.

Specifically, when transistor 134 is turned on current flow may be traced by way of ground through transistor 134 and by way of resistor 145, input terminal 135a to input terminal 135b which is maintained at a constant negative potential. On the other hand with transistor 134 turned off, current flow may be traced from input 135b, input 135a and through resistors 145 and 144 to the negative standard. It is preferred that the pulses produced by pulse former 61 have less than a 50 percent duty cycle thus the values of resistors 138, 139 and 144, 145 are selected so that with transistor 134 turned on the current flow into input 135a is of higher magnitude than when transistor 134 is turned off and at exactly 3600 p.p.s. a condition of balance is achieved in which the average current is equal to zero. With zero average current a negative polarity control voltage is produced at output 135c of constant value. The control voltage is applied to feedback conductor 55 by way of a ripple filter 150 comprising a series resistor 152 and a capacitor 154 and battery 155 connected to ground.

When the frequency of output 60 is of value greater than 3600 p.p.s., transistor 134 is switched on and off at the increased frequency. In proportion to the increased frequency (more pulses per unit time) a finite average current is produced which flows into terminal 135a. Therefore the potential of the control voltage increases in value in a negative direction with a rate of change proportional to the increase in frequency. This potential change is effective to decrease the slope of the voltage ramps at conductor 65 thereby to decrease the PRF of the sawtooth. Accordingly there is a resultant decrease in the PRF of the pulse train at output 15 and output 60. In this manner the frequency is varied in a direction to decrease the frequency error until balance is achieved and the average current at input terminal 135a is equal to zero.

In similar manner when the frequency at output 60 is of value less than 3600 p.p.s., transistor 134 is switched on and off at the decreased frequency. In proportion of the decreased frequency a finite average current is produced which flows out of terminal 135a. Thus the potential of the control voltage increases in value in a positive direction with a rate of change proportional to the decrease in frequency. This potential change is effective to increase the slope of the voltage ramps on conductor 65 thereby increasing the PRF of the sawtooth for a resultant increase in the PRF of the pulse train at outputs 15 and 60. In this manner the frequency is varied in a direction to decrease the frequency error until balance is achieved and the average current at input terminal 135a is equal to zero.

With the above explanation of the invention it will be understood that the control voltage on conductor 55 may be effective to vary the value of the constant current over a substantial range. For example the value of the constant current may be varied over a range of three to one.

Those skilled in the art understand how to select the values of the circuit components. It may be helpful, however, to state that the following values for the range capacitors were found to be satisfactory:

Capacitors:
    67a—.047 mfd.
    68a—.022 mfd.
    69a—.0047 mfd.
    70a—.0022 mfd.
    71a—390 picofarad
    73—100 picofarad

What is claimed is:

1. A frequency response analyzer having a function generator for providing stimulating signals over a frequency range to a system under test and a correlator for comparing the output of the system under test with the stimulating signal to provide measurements comprising:

said function generator including generator means for producing a first train of pulses having a PRF which may be varied over a range of PRF thereby to vary the frequency of said stimulating signals over said frequency range, and counter and switch means responsive to said first pulse train for producing constant amplitude stimulating signals in the form of uniform composite cyclic waveforms, said correlator including a sine multiplier having an output connected to first integration means and a cosine multiplier having an output connected to second integration means, means for applying said output of said system under test simultaneously to each multiplier, controller means coupled to said generator means and to said counter and switch means and responsive to the outputs therefrom for synchronizing the operation of said correlator with said stimulating signal, said generator means including:
(A) selectively adjustable means for providing signals representing a selected number value of a first pulse train PRF within said frequency range, said number values being formed into a plurality of bands of values,
(B) switching means connected to said adjustable means for producing said first train of pulses having a PRF which is (1) varied in accordance with the band associated with said selected number value and (2) proportional to the value of an applied control signal,
(C) means for dividing the PRF of said first pulse train by said selected number value for producing a second train of pulses, and error detector means connected to said dividing means and said switching means to produce said control signal having a rate of change in value proportional to and a direction related to any difference in the PRF of said second pulse train from a predetermined value.

2. The analyzer of claim 1 in which said signals provided by said adjustable means are binary coded decimal signals representing a selected decimal value and in which each of said bands has a weight related to the decimal values within the respective band whereby said first train of pulses produced by said generator means has a PRF which is directly proportional to the weight of the band associated with said selected decimal value.

3. The analyzer of claim 2 in which said switching means includes ram generator means, a plurality of range capacitors, means connecting selected ones of said range capacitors in circuit with said ramp generator means in accordance with said band associated with said selected decimal value, said ramp generator producing a ramp voltage starting from a reference potential of slope directly proportional to the value of said applied control signal and inversely proportional to the value of said range capacitors connected in circuit.

4. The analyzer of claim 3 in which said switching means includes switching circuit means for initiating a new ramp voltage starting from said reference potential upon said ramp voltage increasing to a predetermined value thereby to generate sawtooth waveforms, and means for converting said sawtooth waveforms into rectangular pulses for producing said first train of pulses.

5. A frequency response analyzer having a function generator for providing sinusoidal stimulating signals to a system under test and a correlator for comparing the output of said test system with the stimulating signal comprising:

said function generator including generator means for producing a first train of pulses having a PRF which may be varied over a range of frequencies, counter and switch means in response to said first pulse train for producing separate signals of rectangular and triangular waveform in which the slopes of one of the triangular sides is reversed at each 90° of said sinusoidal stimulating signal formed by summing said rectangular and triangular waveforms, said correlator including a sine multiplier having an output connected to first integration means and a cosine multiplier having an output connected to second integration means, means for applying said output of said system under test simultaneously to each said multiplier, controller means in response to said first pulse train for synchronizing the operation of said correlator with said stimulating signal, said generator means including
(A) selectively adjustable means for providing binary signals representing a selected decimal number value of a first pulse train PRF within said frequency range,
(B) ramp generator means, a plurality of range capacitors, means connecting selected ones of said range capacitors in circuit with said ramp generator means in accordance with said selected decimal value being within a predetermined one of a plurality of bands of decimal values, said ramp generator producing a ramp voltage starting from a reference ramp voltage potential of slope directly proportional to the value of an applied control voltage and inversely proportional to the value of said range capacitors connected in circuit,
(C) switching circuit means for initiating a new ramp voltage starting from said reference potential when said ramp voltage increases to a predetermined value thereby to generate said first train of pulses,
(D) means for dividing the PRF of said first pulse train by said selected decimal value for producing a second train of pulses,
(E) means for forming each pulse of said second train of pulses into rectangular shape of constant pulse width, and
(F) averaging means connected to said ramp generator means and said forming means for averaging said rectangular shaped pulses to provide at an input thereof a zero average current and at an output thereof a constant value control voltage when said PRF of said second pulse train is equal to a predetermined value and to provide at said input a finite average value current and at said output a control voltage having a voltage rate of change proportional to and a direction related to any difference in said PRF from said predetermined value whereby the PRF of said second train of pulses is varied in a direction to decrease said PRF difference until said second pulse train PRF is equal to said predetermined value.

6. The analyzer of claim 5 in which said averaging means comprises an integrator having first and second inputs, first resistance means connected between said first input and an accuracy controlled voltage standard, second resistance means connected between said second input and said voltage standard, a switching device for connecting said first resistance means to a point of reference potential during the time of each rectangular shaped pulse from said pulse forming means.

7. The analyzer of claim 6 in which said first resistance means comprises a first pair of resistors connected together at a first junction, said first junction being coupled to said switching device, said second resistance means comprising a second pair of resistors connected together at a second junction, said second junction being coupled to said second input and an end of one of said second pair remote from said section junction being connected to said reference potential.

8. The analyzer of claim 5 in which said dividing means includes means for counting said first train of pulses and for producing BCD output signals corresponding to said count, gating means connected to said adjustable means for producing a pulse output when said count reaches said selected decimal value to (1) reset said counting means to begin a new count and (2) generate said second train of pulses.

References Cited

UNITED STATES PATENTS 3,340,469  9/1967  Catherall et al. _____ 324—57

EDWARD E. KUBASIEWICZ, Primary Examiner

U.S. Cl. X.R.

235—181